United States Patent [19]

Howorth

[11] 4,022,006
[45] May 10, 1977

[54] TEXTILE YARN PROCESSING MACHINES

[76] Inventor: Frederick Hugh Howorth, Ollerton Hall, Withnall, Chorley, Lancaster, England

[22] Filed: Dec. 17, 1975

[21] Appl. No.: 641,503

Related U.S. Application Data

[63] Continuation-in-part of Ser. No. 541,452, Jan. 16, 1975, abandoned, which is a continuation-in-part of Ser. No. 392,223, Aug. 28, 1973, abandoned.

[30] Foreign Application Priority Data

Sept. 12, 1972 United Kingdom ............ 42214/72

[52] U.S. Cl. .............................. 57/34.5; 15/306 A; 226/97
[51] Int. Cl.² ......................................... D01H 11/00
[58] Field of Search ............ 57/34.5, 56; 15/306 A, 15/306 R; 242/18 AA; 226/7, 97

[56] References Cited

UNITED STATES PATENTS

| | | | |
|---|---|---|---|
| 288,720 | 11/1883 | Miller | 15/306 A |
| 2,704,430 | 3/1955 | Harris | 57/34.5 X |
| 3,112,601 | 12/1963 | McCullough | 57/56 X |
| 3,307,761 | 3/1967 | Miller et al. | 226/7 |

FOREIGN PATENTS OR APPLICATIONS

| | | | |
|---|---|---|---|
| 1,081,011 | 12/1954 | France | 57/34.5 |
| 308,245 | 7/1955 | Switzerland | 57/34.5 |
| 881,543 | 11/1961 | United Kingdom | 57/34.5 |

*Primary Examiner*—Herbert Goldstein
*Assistant Examiner*—Charles Gorenstein
*Attorney, Agent, or Firm*—Norris & Bateman

[57] ABSTRACT

A textile machine having suction apparatus for processing yarns continuously running at high speed to permit threading up, doffing and the like without stopping the machine, the apparatus comprising main yarn conveying ducts extending along opposite sides of the machine, each duct having a series of small diameter straight unobstructed passages of predetermined length spaced along and opening into the duct, the axis of each passage being of predetermined related length and diameter and being inclined at an acute angle with respect to the longitudinal axis of the duct. A suction fan draws air in through said passages for tensioning the yarn passing through the passages and establishing a column of yarn conveying air along the duct.

7 Claims, 6 Drawing Figures

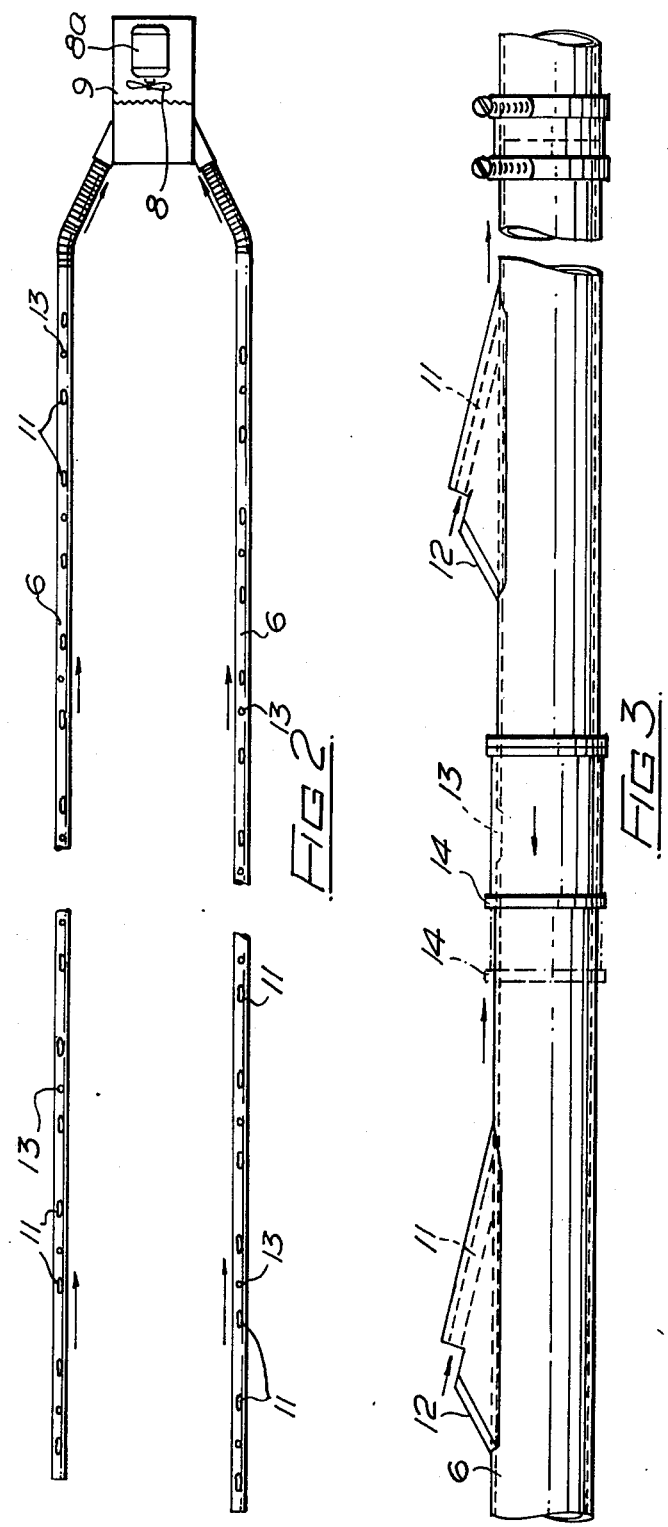

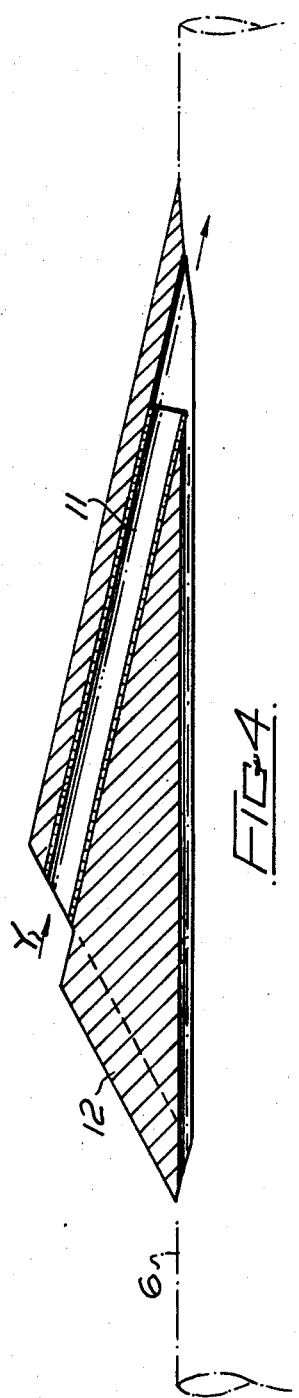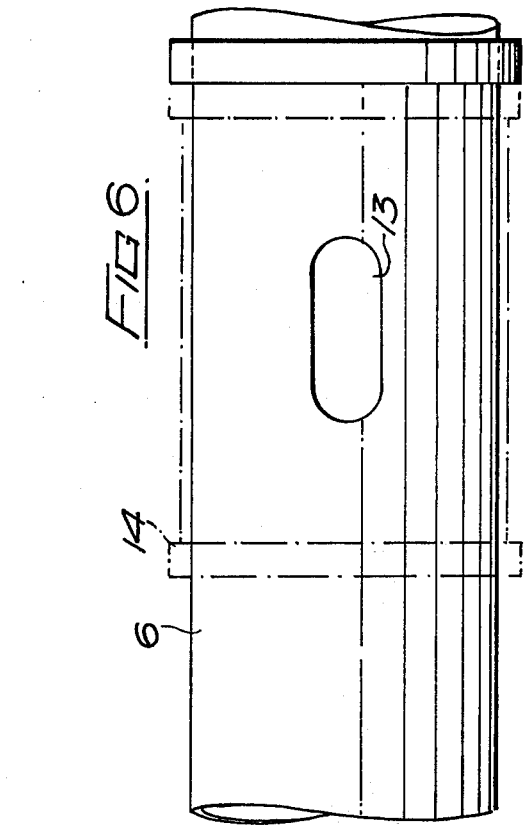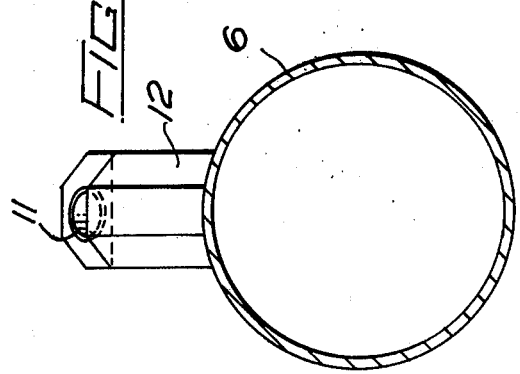

TEXTILE YARN PROCESSING MACHINES

This is a continuation-in-part of copending application Ser. No. 541,452 filed Jan. 16, 1975, now abandoned which in turn is a continuation-in-part of Ser. No. 392,223 filed Aug. 28, 1973, now abandoned.

This invention relates to improvements in textile yarn processing machines and more particularly to suction apparatus for receiving and conveying yarn ends as during doffing or awaiting threading up during threading-up while the machine is running.

Yarn texturizing machines for example may have upwards of one hundred spinner positions with two yarn paths at each spinner. With known suction apparatus, due to air problems and characteristics, it is not possible to doff simultaneously at more than four positions on each side of the machine, making a maximum of eight positions. The situation has been further aggravated by a considerable increase in yarn output speeds which necessitates higher yarn pick-up and conveying speeds by the suction apparatus. In the known devices adequate yarn tension had been reached by having high velocities in a main suction duct with appropriately sized holes in the duct some of which are selectively covered when not is use in order to maintain the suction at the four open holes to be used for receiving the yarn ends.

The suction apparatus of the invention is primarily for use with synthetic filament machines where yarn speeds are substantially higher than in cotton processing machines, being in the order of up to 1000 meters per minute. It is however also applicable to the slower yarn speed cotton processing machines. At the processing speeds tension must be applied to the yarn in order to maintain processing because if not maintained during the process of changing packages it would require the total machine (some 60 or more positions in many machines) to be shut down each time a new package was required at any individual position.

In a preferred embodiment the invention comprises a main suction duct formed along its sides with a spaced series of small diameter inlet passages each arranged at a suitable, preferably acute, angle to the axis of the main duct giving access to the main duct in the direction of air flow through the main duct, so as to tension the yarn passing through each passage, the yarn thereby being introduced at high speeds into the main duct so that in threading up a large number of yarn ends may be dealt with substantially simultaneously along the main duct.

The invention has as a major object a spectacular increase in the doffing and piecing up capacities of yarn processing machines.

A further object of the present invention is the minimizing of stop time for yarn processing machines as when doffing or threading up so that a plurality of yarn ends may be simultaneously dealt with by providing a plurality of novel small diameter angularly disposed passages leading into a main suction duct, through which passages yarn ends are drawn at high speed.

Further objects of the invention will appear as it is described with reference to the accompanying drawings wherein:

FIG. 2 is an enlarged plan view of apparatus having two main suction ducts one at each side of the machine;

FIG. 3 is an enlarged elevation showing a longitudinal portion of one of the main ducts of FIG. 2 having two yarn inlet passages;

FIG. 4 is an enlarged longitudinal section showing an inlet passage structure;

FIG. 5 is a transverse section through a main duct looking in the direction of the arrow Y of FIG. 4; and FIG. 6 is an elevation of a portion of the main duct showing a hole therein selectively covered by a sliding sleeve.

Figure 1:
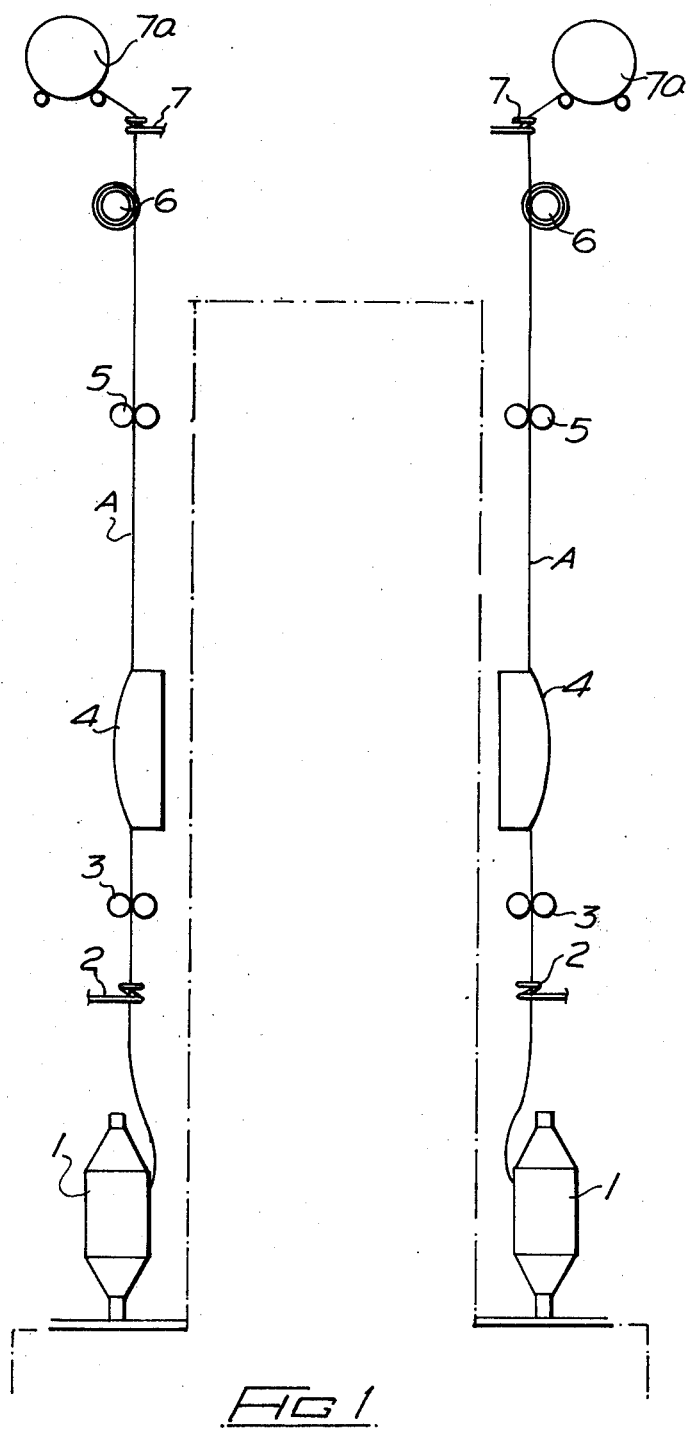
FIG. 1 is a diagrammatic elevation of a yarn processing apparatus showing the passage of the yarn.

Referring to FIG. 1 a machine for continuously processing yarn A is constructed with a series of bobbins in rows on each side of the machine and two such bobbins 1 are shown in FIG. 1 by way of example. The yarn is drawn from the bobbins through guide eyes 2 by feed rollers 3 and fed through a heater 4 by further rollers 5 and over a main suction duct 6 on its way through a further guide eye 7 to a take-up bobbin 7.

As shown in FIG. 2, the main suction ducts 6 at opposite sides of the machine may be connected at one end to a suction fan 8 arranged in a filter box or chamber 9, the fan being driven by a motor 8a, or the ducts 6 may be connected to a header connected with the fan chamber 9. The ends of main ducts 6 opposite the suction fan connection may be either closed or provided with a small aperture, so that most of the air entering each duct is drawn in through a series of longitudinally spaced special inlet passages indicated at 11 in FIG. 2 and later to be described in more detail, and the arrangement is such that substantially the same amount of air per unit time at substantially the same velocity is drawn through each inlet passage 11.

Usually in a synthetic yarn texturizing machine one passage 11 is provided for each pair of spinner positions, that is one passage 11 for each yarn path, and each duct 6 extends the length of the machine.

FIG. 3 shows a portion of a duct 6 wherein two spaced inlet passages are illustrated, and FIG. 4 illustrates a preferred structure and disposition of a yarn inlet passage 11. A boss 12 which may be an aluminum molding is fixed on the outer periphery of duct 6 and a small diameter bore 20 extends straight through the boss to open at its inner end through the duct wall into duct 6.

Preferably bore 20 is lined along its major length with a thin-walled cylindrical metal tube 21 the inner uniform diameter cylindrical periphery of which is smooth for minimum resistance to air and yarn movement, and for precise definition of the diameter of passage 11 which is important because the invention includes the discovery that operative yarn tension imparting air flow through passage 11 is obtainable only if passage 11 has a diameter within predetermined limits and a related effective length within predetermined limits. It has further been determined that optimum results are obtained where the diameter of passage 11 is in predetermined ratio to the diameter of the main duct 6, and where the axis of passage 11 is inclined at an acute angle to the axis of the duct in the direction of air flow along the duct.

In the invention because of the high speed of the air drawn through the small diameter passages 11 the yarn drawn through passages 11 is under considerable tension while passing through the passages in that it is drawn through the passage at a specific speed equal to or in the excess of its running speed in the machine and is injected at high speed into the larger diameter main duct 6 which functions essentially to collect and convey all of the injected yarn at reduced speed to a collection or other disposal point as at 9. In this manner the invention differs over hitherto known suction duct arrangements wherein the yarn is drawn along the main duct under tension.

Because of the restricted diameter of passage 11 only relatively small amounts of air are drawn into the duct at each passage 11, the total of all of the air drawn in through all of the passage 11 being essentially only enough to establish the moving yarn conveying air column within duct 6, so that in the invention it is not necessary to cover up suction passages not being used.

The diameters of all passages 11 are preferably the same so that the yarn speed and tension in each is about the same.

It is also preferable that the axis of passage 11 extend in a straight line at an acute angle relative to the longitudinal axis of duct 6. While for optimum operation with many different types of yarn, this acute angle may advantageously be in the range of 10° – 16°, angles up to 90° are sometimes available. As the angle approaches 90° however it may be necessary to have in the inner ends of passage defining tubes project somewhat into the duct to ensure proper air flow through the passage, but such projections are objectionable in that they may snag the yarn being conveyed along the duct.

Therefore the optimum arrangement is that passage 11 be disposed at a small acute angle relative to the duct axis in the direction of desired yarn passage through the duct, with no projection within the duct.

The effective diameter of passage 11 as defined by tube 11 is advantageously between one-eigth and one-fourth where the duct diameter is in the range of 1½ to 2. A ratio of passage 11 diameter to duct 6 diameter in the neighborhood of 1 to 10 is desirable.

The effective length of passage 11 in the foregoing is preferably in the range of about 3 to 6.

Because of the small amount of air taken in through each of the suction passages 11, it has been found that it is no longer necessary to close off suction points to maintain performance. Furthermore, it has been found in these circumstances that the prime mover establishing the air column in the duct may be a low volume, high pressure suction system the horsepower of which is no greater than in any previous methods, that is substantially 5.5 H.P.

With the foregoing arrangement and with only a 5 H.P. fan motor it is possible to have up to fifty suction passages 11 all in a yarn texturizing machine all working at the same time. Each passage 11 may look after two spinner positions and each spinner position may have two yarn paths. Further, if a suction passage 11 is required for each spinner position, 50 spinner positions are provided per side with 50 suction passages per side. The suction passages 11 at one side of the machine may be operated alternatively with those on the other side.

The sides of the molding 12 containing the passages 11 may be at an angle to the duct not exceeding 30° but are preferably inclined to lie substantially parallel to the passage 11 with a V-notch at the entrance side of the passage 11 and the side sloping away from the V-notch at an angle of 24° – 26° to the duct 6.

Spaced along each duct 6 and usually located between two adjacent passages 11 are duct wall openings 13, normally closed by slidable sleeves that are somewhat the same as the duct suction opening covers in British Pat. No. 881,543. Openings 13 are however not running yarn intake openings but are provided for selective temporary opening by the operator to insert loose waste.

As in known arrangements the yarn from ducts 6 is collected in a box or chamber 9 and yarn eliminator at the exhaust end of the main suction ducts 6, one of which runs down each side of the machine, so that only air and fumes from the heater pass through the vacuum exhauster 8.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a machine having apparatus for processing textile yarns continuously running at high speed, to permit threading up, doffing and the like without stopping the machine, said apparatus comprising means providing a main yarn conveying duct, means for introducing yarn into said duct comprising means providing a series of straight line unobstructed passages of predetermined length and materially smaller diameter than said duct spaced along the sides of and opening directly into the duct, the axes of all of said passages being inclined at the same acute angle with respect to the longitudinal axis of said duct in the direction of movement of said air column in said duct, and yarn ends during threading up and broken ends being adapted to enter the outer ends of said passages, means for drawing air in through said passages at a predetermined high speed and for establishing a reduced speed column of yarn conveying air moving along the duct, the diameter and related effective length of each such passage being such as to provide a sufficiently high speed of air travel therethrough to move yarn rapidly therealong while imparting tension thereto until it enters said conveying duct, and said yarn after entering said duct being conveyed therealong in said air column.

2. In the machine defined in claim 1, each said passage being inclined within the range of 10°–13° relative to the duct axis.

3. In the machine defined in claim 1, said duct being closed at one end and suction means connected to the other end of said duct for establishing said moving air column.

4. In the machine defined in claim 1, said duct having a small aperture at one end and suction means connected to the other end of said duct for establishing said moving air column.

5. In the machine defined in claim 1, said duct being about 1½ to 2 inches in diameter, each said passage being in the range of about one-eighth to one-fourth inch in diameter, and each passage length being in the range of about 3 to 6 inches.

6. In the machine defined in claim 1, said passage comprising a through bore lined with a smooth surfaced cylindrical tube.

7. In the machine defined in claim 1, the air speed in each said passage being such that it conveys the yarn along the passage at a speed equal to the speed of running of said yarns in said machine.

* * * * *